(12) United States Patent
Duc et al.

(10) Patent No.: US 9,512,309 B2
(45) Date of Patent: *Dec. 6, 2016

(54) REFRIGERATOR INTERIOR LINER

(71) Applicant: TOTAL RESEARCH & TECHNOLOGY FELUY, Seneffe (Feluy) (BE)

(72) Inventors: Michel Duc, Pau (FR); Jan Neelen, Arbus (FR); Mark O'Neill, Sauvagnon (FR)

(73) Assignee: Total Research & Technology Feluy, Seneffe (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,845

(22) Filed: Apr. 27, 2015

(65) Prior Publication Data

US 2015/0225493 A1 Aug. 13, 2015

Related U.S. Application Data

(60) Continuation of application No. 14/222,856, filed on Mar. 24, 2014, now Pat. No. 9,127,149, which is a division of application No. 13/203,886, filed as application No. PCT/EP2010/052984 on Mar. 9, 2010, now Pat. No. 8,785,545.

(30) Foreign Application Priority Data

Mar. 10, 2009 (EP) ..................................... 09154704

(51) Int. Cl.
| | | |
|---|---|---|
| *C08J 3/22* | (2006.01) | |
| *C08L 25/06* | (2006.01) | |
| *C08F 2/38* | (2006.01) | |
| *C08F 279/02* | (2006.01) | |
| *C08L 51/04* | (2006.01) | |
| *F25D 23/08* | (2006.01) | |
| *C08F 12/08* | (2006.01) | |
| *F25D 23/06* | (2006.01) | |

(52) U.S. Cl.
CPC .................. *C08L 25/06* (2013.01); *C08F 2/38* (2013.01); *C08F 12/08* (2013.01); *C08F 279/02* (2013.01); *C08L 51/04* (2013.01); *F25D 23/08* (2013.01); *F25D 23/066* (2013.01)

(58) Field of Classification Search
CPC ...................................................... C08F 12/08
USPC .......................................................... 524/525
See application file for complete search history.

(56) References Cited

U.S. PATENT DOCUMENTS

| | | | |
|---|---|---|---|
| 5,112,921 A | 5/1992 | Schwaben et al. | |
| 6,706,814 B2* | 3/2004 | Demirors ............... | C08F 279/02 525/191 |
| 2002/0072570 A1* | 6/2002 | Kawano ................. | C08F 279/02 525/232 |
| 2006/0235130 A1 | 10/2006 | Hanner et al. | |

* cited by examiner

*Primary Examiner* — Hui Chin
(74) *Attorney, Agent, or Firm* — Albert Shung

(57) ABSTRACT

A rubber modified monovinylaromatic polymer composition may include a monovinylaromatic polymer matrix. The monovinylaromatic polymer matrix may have an average molecular weight in weight $\overline{Mw}$ above 150,000 g/mol. Rubber particles may be dispersed in the monovinylaromatic polymer matrix. The rubber particles may have a volume median particle size (RPS volume) ranging from 7 µm to 10 µm, a monomodal distribution, a ratio of RPS volume to surface median particle size (RPS surface) that is below 2, a crosslinking of the rubber expressed as a swell index (SI) above 13.8, and a rubber phase volume fraction (RPVF) of at least 39%. A refrigerator interior liner may be made of the rubber modified monovinylaromatic polymer composition.

20 Claims, 2 Drawing Sheets

REFRIGERATOR INTERIOR LINER

CROSS-REFERENCE TO RELATED APPLICATIONS

This application is a Continuation of U.S. patent application Ser. No. 14/222,856, filed on Mar. 24, 2014, which is a Divisional of U.S. patent application Ser. No. 13/203,886, filed on Nov. 11, 2011, now issued as U.S. Pat. No. 8,785,545, which is a National Stage Entry of PCT/EP2010/052984, filed on Mar. 9, 2010, which claims priority from EP 09154704.2, filed on Mar. 10, 2009.

FIELD OF THE INVENTION

The present invention concerns a refrigerator interior liner made of a rubber modified monovinylaromatic polymer composition such as, by way of example, an ABS (acrylonitrile-butadiene-styrene) or a HiPS (high impact polystyrene). "Refrigerator", in the present invention has to be understood as (i) an apparatus having a compartment at about 4° C. and a compartment at −18° C. or even as low as about −30° C. or as (ii) an apparatus (freezer) having one or more compartments at −18° C. or even as low as about −30° C.

BACKGROUND OF THE INVENTION

The liner of a refrigerator is in contact on one side with the food inside the refrigerator and on the other side with the insulation foam. Said insulation foam, typically a polyurethane foam, is made with a blowing agent which can cause environmental stress cracking (ESCR) of the liner. ESCR is the formation of cracks in a material caused by relatively low tensile stress and environmental conditions. The blowing agent can cause liner blistering, catastrophic cracks, tiny cracks (crazing) and loss of impact properties (embrittlement), as well as stress whitening and/or dissolution. The following prior arts relate to this subject.

U.S. Pat. No. 5,221,136 describes a refrigerator comprising an ABS or HiPS liner but said liner comprises a barrier layer on the side facing the polyurethane foam. The barrier layer comprises a polymer or copolymer of ethylene or propylene containing 0 to 40% by weight of a block copolymer rubber.

U.S. Pat. No. 5,834,126 is similar to the one above but the composition of the barrier layer resistant to the action of polyurethane foam blowing agents has an effective amount of a polyethylene modified with a compound such as maleic anhydride, maleic acid, malic anhydride derivatives, maleic acid derivatives, or mixtures thereof and an effective amount of a rubber. The barrier layer composition may contain polyethylene, polypropylene, polybutylene, or copolymers thereof.

Other prior arts are dealing with rubber modified monovinylaromatic polymers which are deemed to be of interest in a lot of applications including the refrigerators but are not specific to the refrigerators.

U.S. Pat. No. 6,706,814 describes a rubber modified monovinylidene aromatic polymer comprising:
a) a monovinylidene aromatic polymer matrix; and
b) rubber particles dispersed therein, characterized in that the rubber particles are produced from a diene rubber having substantially linear structure containing less than one long chain branch per 10,000 carbon atoms in the polymer backbone with a solution viscosity of 5 cPoise to 1,000 cPoise and a Mooney Viscosity of 5 to 120.

The rubber particles are dispersed in the form of small and large particles, wherein the volume average particle diameter of the small particles is from about 0.1 to about 2 micrometers and volume average particle diameter of the large particles is from about 2 to about 6 micrometers. A lot of applications are described including refrigerators and freezers.

U.S. Pat. No. 6,545,090 describes a rubber modified monovinylidene aromatic polymer comprising:
a) a monovinylidene aromatic polymer matrix,
b) rubber particles dispersed therein, characterized in that the rubber particles are produced from a diene rubber having I) a high molecular weight component and II) a low molecular weight component; the high molecular weight component having a weight average molecular weight at least two and one half times greater than the weight average molecular weight of the low molecular weight component and the low molecular weight component constitutes from about 20 to about 80 weight percent of the total rubber content, wherein both components I and II have a 1,4 cis content of greater than 70 percent and III) the rubber is grafted using a graft promoting chemical initiator, with monovinylidene aromatic polymer to the extent that the amount of grafted rubber is at least 30 percent of the total rubber at phase inversion.

The rubber particles are dispersed in the form of small and large particles, wherein the volume average particle diameter of the small particles is from about 0.1 to about 2 micrometers and the volume average particle diameter of the large particles is from about 2 to about 6 micrometers and the small rubber particles are from 20 to 80 weight percent of the total rubber. A lot of applications are described including refrigerators and freezers.

U.S. Pat. No. 6,441,090 describes a rubber modified monovinylidene aromatic polymer having a bimodal particle size distribution comprising:
a) rubber particles of a star or branched low viscosity rubber having a volume average particle size of from 0.1 to 2 μm, and a cellular or core shell morphology or mixture thereof, and
b) rubber particles of a star or branched low viscosity rubber, linear diene rubber or block copolymer rubber having a volume average particle size of from 0.5 to 10μ,
characterized in that the rubber particles of b) are more dense than the rubber particles of a), having a smaller occluded monovinylidene aromatic polymer content than the particles of a), wherein the particles of a) are from 50 to 99 weight percent of the total diene rubber content. These rubber-reinforced bimodal compositions are described as useful in a wide variety of applications such as consumer electronics, small household appliances, toys and furniture. These polymers are also deemed to be useful in extrusion applications such as in the preparation of a gloss layer using coextrusion techniques for refrigerator liners.

U.S. Pat. No. 7,115,684 describes a mass polymerized rubber-modified polymeric composition comprising: a continuous matrix phase comprising a polymer of a monovinylidene aromatic monomer, and optionally, an ethylenically unsaturated nitrile monomer, and discrete rubber particles dispersed in said matrix, said rubber particles produced from a rubber component comprising from 5 to 100 weight percent of a functionalized diene rubber having at least one functional group per rubber molecule capable of enabling controlled radical polymerization; wherein the composition is further characterized by:
a) a volume average rubber particle size of from about 0.15 to 0.35 micron, b) a total rubber phase volume between 12 and 45 percent, based on the total volume of the combination of the matrix phase and the rubber particles;
c) a partial rubber phase volume between 2 and 20 percent characterized by rubber particles having a volume average particle size of greater than 0.40 microns; and
d) a crosslinked rubber fraction of at least 85 percent by weight, based on the total weight of the rubber particles.

These rubber modified polymers can be used in a variety of applications including injection molding and thermoforming of refrigerator liners, household appliances, toys, automotive applications and furniture.

Another technical problem is the environmental stress cracking resistance of the plastic material induced by localized sharp temperature variations and/or the presence of fats and oils in food or any aggressive chemical agent that may get in contact with the plastic material.

It is proposed to provide a plastic sheet structure to be thermoformed into a refrigeration liner that is resistant to chemical attack.

It is an object of the invention to provide a refrigeration appliance liner to be fabricated from a thermoformable, plastic sheet material exhibiting resistance to chemical attack e.g. blistering, cracking, crazing, as mentioned above, by polyurethane foaming agents.

It is an object of the invention to provide a refrigeration appliance liner to be fabricated from a thermoformable, plastic sheet material which retains a high level of toughness (impact properties) and strength (tensile properties), even at low temperatures (−20° C. or less).

It is another object of the invention to provide a liner made from a plastic sheet material that maintains processability similar to HIPS or ABS, including favorable extrusion conditions and similar thermoforming behavior.

It has now been discovered a refrigerator interior liner made of a rubber modified monovinylaromatic polymer composition which at least fits one of the above criteria. In brief the main features of this polymer composition are (i) a large size of moderately crosslinked rubber particles combined with a monomodal particle size distribution and (ii) a rubber phase volume fraction (RPVF) of at least 39%. The broadness of the rubber particle size distribution estimated by the RPS volume-to-RPS surface ratio, is preferably below 2.0, more preferably below 1.5 and most preferably equal or below 1.4. RPS volume means the volume median particle size, RPS surface means the surface median particle size of the rubber.

Secondarily, the average molecular-weight in weight of the PS phase should be sufficiently high, whereas the global concentration of low-molecular weight plasticizers such as white mineral oil and PS oligomers should be kept low-to-moderate.

The present invention also relates to a process to make said polymer. The process for making HIPS is well known to those skilled in the art and consists of polymerizing styrene monomer in the presence of dissolved rubber. Polymerization of styrene, and optionally a comonomer, is initiated by heating and/or by an initiator, by way of example a radical initiator. The rubber is "dissolved" in the styrene monomer (actually the rubber is infinitely swollen with the monomer). The usual rubber types utilized in the manufacture of HIPS include polybutadiene (PB), styrene-butadiene rubber (SBR), and styrene-butadiene-styrene rubber (SBS). Polystyrene is initially formed from the styrene monomer within the homogeneous rubber solution in styrene. At the beginning of the polymerization the reacting solution is at a point prior to the rubber/styrene inversion point, i.e. the point at which the solution being reacted goes from polystyrene particles in a rubber/styrene monomer matrix to rubber particles in a polystyrene matrix. When the degree of polymerization is about equal to the weight % of rubber in the system, it inverts e.g. the styrene/styrene polymer phase becomes continuous and the rubber phase becomes discontinuous. Styrene is polymerized around and within the rubber particles which leads to polystyrene inclusions in the rubber particles. A portion of the styrene is polymerized by grafting on the rubber, another portion is homopolymerized, said portion is referred to as a "non-grafting" polymerization. In HIPS a part of the styrene may be replaced by unsaturated monomers copolymerizable with styrene such as other monovinylaromatic monomers, alkyl esters of acrylic or methacrylic acid and acrylonitrile. The same mechanism of "grafting" and "non-grafting" occurs with the styrene comonomer, which means one portion of the styrene and of the comonomer are polymerized by grafting on the rubber, another portion of the styrene and of the comonomer are copolymerized. The properties of HIPS are related to the amount of rubber, the type of rubber, the rubber particles size distribution and volume fraction as well as the polystyrene included in the rubber particles. The proportion of styrene, and the optional comonomer, which is grafted (polymerized by the "grafting" way) is linked to the functionalization of the rubber. Rubber-modified vinylaromatic polymer compositions are well-known in the prior art. Composition fine-tuning so as to reach well balanced physical properties remains however a matter of know-how. Apart from the control of the phase rheological behaviours, the control of rubber phase grafting that occurs typically in situ during the conventional radical HIPS process is a challenge hard to overcome. Rubber phase grafting is indeed usually adjusted through the addition of organic peroxides, generating preferably H-abstracting radicals by thermal decomposition, and well-chosen according to their half-life decomposition temperature and the reactor temperature settings. However, the in situ rubber grafting during the HIPS process remains intrinsically a random reaction.

The main features of the process of the present invention are the use of a grafting initiator, a viscous rubber essentially of linear structure and the use of a chain transfer agent before the phase inversion. Additionally, the process as described in the present invention is performed in one or several polymerization reactors, under batch-wise or continuous polymerization conditions, with preferably limited back-mixing conditions within the inversion reactor—i.e. the reactor within phase inversion takes place—and within the just-former and just-subsequent reactors, and with also limited spillback flows between these aforementioned reactors.

EP 1201693 A2 has already described similar compositions for food containers and trays for a refrigerator but not for the liner. Moreover this prior art is silent on the ESCR of the liner due to the blowing agent of the insulation.

WO 94 12551 A1 describes impact styrenic polymers having good ESCR properties and improved physical properties to be employed in the production of thinner sheet stock for use in the manufacture of, for example, refrigerator liners, thereby resulting in reduced liner manufacturing costs. The compositions have a volume average particle size of at least 4 microns and a melt strength of at least 4.5 grams. There are no specific requirements for the rubber and nothing is mentioned on the broadness of the rubber particle size distribution.

BRIEF SUMMARY OF THE INVENTION

The present invention is a refrigerator interior liner made of a rubber modified monovinylaromatic polymer composition comprising:
a) a monovinylaromatic polymer matrix having an average molecular weight in weight $\overline{Mw}$ above 150,000 g/mol,
b) rubber particles dispersed therein, said particles having:
a volume median particle size (RPS volume) of about 8.5 μm,
a monomodal distribution with essentially no shoulder,
a low-to-moderate crosslinking of the rubber expressed as a swell index (SI) above 13.8,
a rubber phase volume fraction (RPVF) of at least 39%,
c) a moderate amount of low-$\overline{Mw}$ plasticizers, defined as the weight fraction of solubles in methanol, and such that the weight ratio c/(a+b+c) ranges from 0 to 5%.

The present invention is also a process for preparing the above composition to make the refrigerator interior liner comprising:
a) forming a polymerizable mixture comprising at least one monovinylaromatic monomer and optionally one or more comonomers,
b) dissolving at least a viscous rubber of essentially linear structure in said polymerizable mixture to form a rubber containing polymerizable solution,
c) contacting a free radical initiator and a chain transfer agent with the polymerizable mixture at conditions whereby phase inversion subsequently occurs, wherein the chain transfer agent is capable to produce an increase of the rubber to PS phase viscosity ratio within the inversion reactor,
d) continuing the polymerization of the solution obtained at step c), optionally in the presence of a free radical initiator, until a monovinylaromatic polymer matrix having rubber particles dispersed therein is obtained.

Optionally there is an additional step for degassing the product of step d) to separate the optional unpolymerized monomers and comonomers, optional diluents and recovering the high impact monovinylaromatic polymer.

Advantageously the chain transfer agent makes the rubber particles less sensitive to the shear rate within the inversion reactor. This results in a homogeneous distribution of large rubber particles.

The advantageous rubber of essentially linear structure within the frame of the present invention is characterized by SV-to-Mooney ratio of at least 2.8, and more preferably above 3.3.

Advantageously the $\overline{Mw}$ of the rubber ranges from 100,000 to 500,000 and preferably from 280,000 to 360,000 g/mol. Advantageously the polydispersity index of the rubber ranges from 2.1 to 2.5 and preferably from 2.1 to 2.3. Rubber molecular-weights can be measured by the conventional size-exclusion chromatography techniques. They are here expressed in PS equivalents, i.e. using iso-molecular PS samples as calibration standards.

The rubbers particularly suitable for this invention have a solution viscosity (SV), measured at 5.43% weight in toluene or styrene, of 50 to 1000 centipoises, preferably from 100 to 500 centipoises and more preferably from 120 to 250 centipoises. The rubbers particularly suitable for this invention also have a Mooney viscosity (ML4+1, 100° C.) of 5 to 120, preferably from 10 to 100 and more preferably from 30 to 60.

The melt-flow index of the modified monovinylaromatic polymer composition to make the liner, measured following ISO 1133 (5 kg loading, 200° C.), is advantageously from 2 to 10, more advantageously from 2 to 7, preferably from 2.5 to 6 and more preferably from 2.5 to 5.

The present invention is also a process for preparing a high impact monovinylaromatic polymer comprising:
a) forming a polymerizable mixture comprising at least one monovinylaromatic monomer and optionally one or more comonomers,
b) dissolving at least a viscous rubber of essentially linear structure in said polymerizable mixture to form a rubber containing polymerizable solution,
c) contacting a free radical initiator and a chain transfer agent with the polymerizable mixture at conditions whereby phase inversion subsequently occurs, wherein the chain transfer agent is capable to produce an increase of the rubber to PS phase viscosity ratio within the inversion reactor,
d) continuing the polymerization of the solution obtained at step c), optionally in the presence of a free radical initiator, until a monovinylaromatic polymer matrix having rubber particles dispersed therein is obtained.

Optionally there is an additional step for degassing the product of step d) to separate the optional unpolymerized monomers and comonomers, optional diluents and recovering the high impact monovinylaromatic polymer.

Advantageously the chain transfer agent makes the rubber particles less sensitive to the shear rate within the inversion reactor. This results in a homogeneous distribution of large rubber particles.

DETAILED DESCRIPTION OF THE INVENTION

Figure 1:
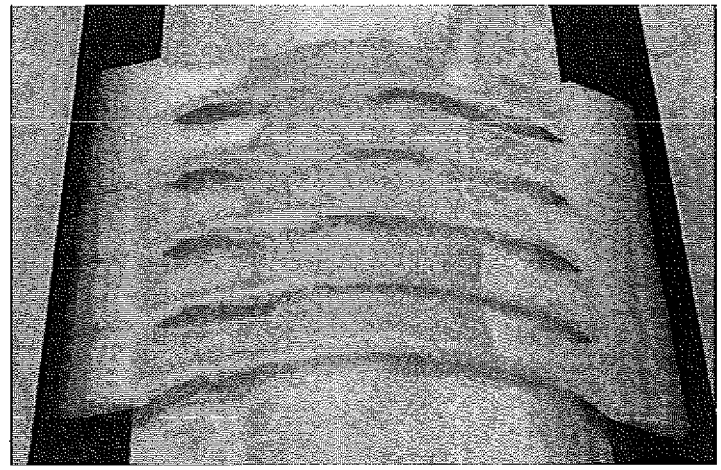
FIG. 1 depicts injected halters exposed to fatty esters and submitted to deformation.

Monovilylaromatic polymer suitable for the present invention are those produced by polymerizing a vinyl aromatic monomer. As regards the monovinylaromatic monomer, it relates to any aromatic having a vinyl function. By way of example mention may be made of styrene, vinyl toluene, alpha-methylstyrene, alpha-ethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene, vinyl-1-naphtalene and vinylanthracene. It would not depart from the scope of the invention to use more than one monovinylaromatic monomer. A part of the monovinylaromatic monomer may be replaced by unsaturated monomers copolymerizable with styrene. By way of example mention may be made of alkyl esters of acrylic or methacrylc acid, acrylonitrile and methacrylonitrile. The proportion of comonomer may be from 0 to 50% by weight for respectively 100 to 50% of the monovinylaromatic monomer.

In a specific embodiment the monovinylaromatic polymer comprises:
i) from 60 to 100 weight % of one or more $C_{8-12}$ monovinylaromatic monomers; and
ii) from 0 to 40 weight % of one or more monomers selected from the group consisting of $C_{1-4}$ alkyl esters of acrylic or methacrylc acid and acrylonitrile and methacrylonitrile; which polymer may contain from about 2 to about 20 percent, preferably from about 3 to about 17 percent, more preferably about 3 to about 15 weight percent rubber, based on the total weight of the rubber modified monovinylaromatic polymer.

Advantageously $\overline{Mw}$ ranges from 150,000 to 250,000 g/mol, preferably from 160,000 to 190,000 g/mol and more preferably from 160,000 to 170,000 g/mol. The polydispersity index (ratio $\overline{Mw}/\overline{Mn}$) ranges e.g. from 2.2 to 3, advantageously from 2.4 to 2.7.

In an embodiment $\overline{Mw}$ ranges from 150,000 to 170,000 g/mol, preferably from 150,000 to 160,000 g/mol.

In another embodiment $\overline{Mw}$ ranges from 180,000 to 220,000 g/mol, preferably from 190,000 to 210,000 g/mol.

As regards the rubbers preferably employed in the practice of the present invention, one can cite those polymers and copolymers which exhibit a second order transition temperature which is not higher than about 0° C., preferably not higher than about −50° C. and more preferably not higher than about −70° C. as determined or approximated using conventional techniques, e.g., ASTM Test Method D-746-52 T.

By way of example rubbers can be selected from the group consisting of:
a) co- and homopolymers of $C_{4-6}$ conjugated diolefins,
b) copolymers comprising from 60 to 85 weight % of one or more $C_{4-6}$ conjugated diolefins and from 15 to 40 weight % of a monomer selected from the group consisting of acrylonitrile and methacrylonitrile and
c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins. The rubber may be prepared by a number of methods, preferably by emulsion or solution polymerization. These processes are well known to those skilled in the art.

Highly preferred rubbers are alkadiene polymers. Suitable alkadienes are 1,3-conjugated dienes such as butadiene, isoprene, chloroprene or piperylene. Most preferred are homopolymers (excepting any coupling monomers) prepared from 1,3-conjugated dienes, with such homopolymers of 1,3-butadiene being especially preferred. Alkadiene copolymer rubbers containing small amounts, for example less than 15, preferably less than 10 weight percent, of other monomers such as monovinylidene aromatics can also be employed if the rubbers meet the other qualifications described herein. The most preferred rubbers are the linear homopolymers of 1,3-butadiene which have a cis content of at least 30 percent. The rubbers suitable for the present invention can be made by anionic polymerization or Ziegler-Natta polymerization well known to those skilled in the art. Such processes are described e.g. in US 2002-107339, the content of which is incorporated in the present invention.

Regarding the rubber materials suitable for use according to the present invention are advantageously rubbers of essentially linear type. An essentially linear rubber is e.g. a rubber which does not contain a significant amount of long chain branches. Such rubbers usually contain less that one long chain branch per 10,000 carbon atoms on the polymer backbone. These rubbers must have molecular-weights in the range most suitable for making HIPS and ABS resins. The micro-structure of the polybutadiene rubbers can be any of the conventional types containing various amounts of 1,2-vinyl, 1,4-cis and 1,4-trans levels. The level of branching in rubbers can be determined readily by the techniques generally well known to those skilled in the art as detailed in T. H. Mourey and S. T. Balke, "A Strategy for Interpreting Multidetector Size-Exclusion Chromatography Data I: Development of a Systematic Approach," Am. Chem. Soc. Symp. Ser., 521, 180 (1993); A. Rudin, "Measurement of Long-Chain Branch Frequency in Synthetic Polymers," in H. G. Barth and J. W. Mays (Eds.), Modern Methods of Polymer Characterization," John Wiley and Sons, New York, 1991; and S. Pang and A. Rudin, "Size-Exclusion Chromatographic Assessment of Long-Chain Branch Frequency in Polyethylenes," Am. Chem. Soc. Symp. Ser. 521, 254 (1993). Another practical way to assess the rubber chain branching degree is from the rubber Solution Viscosity-to-Mooney ML1+4 @100° C. ratio. The lower this ratio, the higher the rubber chain branching. The rubber of essentially linear structure recommended within the frame of the present invention is characterized by SV-to-Mooney viscosity ratio of at least 2.8, and more preferably above 3.3.

Advantageously the $\overline{Mw}$ of the rubber ranges from 100,000 to 500,000 and preferably from 280,000 to 360,000 g/mol. Advantageously the polydispersity index of the rubber ranges from 2.1 to 2.5 and preferably from 2.1 to 2.3. Rubber molecular-weights can be measured by the conventional size-exclusion chromatography techniques. They are here expressed in PS equivalents, i.e. using iso-molecular PS samples as calibration standards.

The rubbers particularly suitable for this invention have a solution viscosity (SV), measured at 5.43% weight in toluene or styrene, of 50 to 1000 centipoises, preferably from 100 to 500 centipoises and more preferably from 120 to 250 centipoises. The rubbers particularly suitable for this invention also have a Mooney viscosity (ML4+1, 100° C.) of 5 to 120, preferably from 10 to 100 and more preferably from 30 to 60.

The rubber is advantageously employed in amounts such that the rubber-reinforced polymer product contains from about 2 to about 20 percent, preferably from about 3 to about 17 percent, more preferably about 3 to about 15 weight percent rubber, based on the total weight of the rubber modified monovinylaromatic polymer.

As regards the rubber phase volume fraction (RPVF) and the swell index (SI) of the rubber particles, we need to explain the calculation of these parameters. In the following calculations the rubber modified monovinylaromatic polymer composition is referred as HiPS for sake of simplicity.

The rubber phase volume fraction is a key parameter that characterizes the rubber dispersed phase and that can be calculated from Dynamic Mechanical Analysis (DMA) data. The rubber phase volume refers to the rubber particles or discontinuous phase, which consists of rubber, trapped polystyrene (occlusions) and grafted polymer.

The Kerner's model (Kerner, E. H., *Proc. Phys. Soc.* 69, 808, 1956) and its simplified versions enable to calculate the modulus of a composite made of spherical soft particles dispersed in a rigid continuous phase. Hashin's model (Hashin, Z., *ASME J. Appl.* Mechanics, 29(1), 143-150, 1962) is particularly well-suited for describing the rubber particle dispersion in HiPS. The RPVF is calculated from Hashin's model involving the plateau-values of the storage modulus measured by DMA at two temperatures:

$T_1$ well below the rubber glass transition temperature ($T_1$<Tg rubber);

$T_2$ corresponding to a well-chosen temperature in between the glass transition temperatures of the rubber and of polystyrene (Tg rubber<$T_2$<Tg PS) at which the storage modulus G' is steady. T2 is preferably chosen between −30 and +30° C.

DMA measurements are carried out on compression-moulded samples, using an ARES (TA Instruments) rheometer in the torsion geometry.

The RPVF/% rubber ratio is important in the manufacture of HIPS materials because it represents the "rubber utilization efficiency" of the process, i.e., how much rubber must be used to obtain similar product quality. The less rubber needed to produce a set of desired properties in a HIPS material, the more efficient the process.

The swell index (SI) is measured by dissolving the HiPS resin in toluene at room temperature (25° C.). After separating the insoluble gel phase by centrifugation, the swollen gel is weighed, dried under vacuum and then the weight of the dry gel is obtained. The swell index is the ratio of the weight of swollen gel to dry gel, and it is a measure of the degree of cross-linking of the rubber phase. The swell index is a common parameter used to characterize the cross-linking degree of a rubber. The higher the swell index, the lower the rubber phase crosslinking level. The Gel Content (or soft insoluble rubbery fraction), defined as the ratio of the weight of dry gel to the initial weight of the polymer sample, gives an indication of both the rubber phase cross-linking and grafting.

The percent rubber is the total amount of rubber in the HIPS and is measured by the well-known Iodine Monochloride (I—Cl) titration method. The less rubber needed to produce a set of desired properties in a HIPS material, the more efficient the process.

The RPVF is at least 39%, advantageously at least 40%, preferably at least 42% and more preferably at least 45%.

Advantageously the SI is at least 14 and preferably at least 16.

As regards the rubber particles size, as used herein, the said particle size is the diameter of the rubber particles as measured in the resultant product, including all occlusions of matrix polymer within rubber particles, which occlusions are generally present in the disperse rubber particles of a rubber-reinforced polymer prepared using mass polymerization techniques. Regarding morphology of the rubber particles in the different groups, as it is well known, the smaller particles typically have a core-shell (single, major occlusion) or cellular (multiple, minor occlusions) morphology. The larger particles would generally have a cellular or similar multiple-occlusion morphology.

The volume median particle size, also referred as RPS volume, is the particle diameter that divides the frequency distribution in volume (3rd order moments) in half; fifty percent of the rubber volume has particles with a larger diameter, and fifty percent of the rubber volume has particles with a smaller diameter. The surface median particle size, also referred as RPS surface, is the particle diameter that divides the frequency distribution in surface ($2^{nd}$ order moments) in half; fifty percent of the rubber surface has particles with a larger diameter, and fifty percent of the rubber surface has particles with a smaller diameter. The mode represents the value that occurs most frequently in a distribution. In particle size distributions, the mode is the particle diameter that occurs most frequently.

In the present invention, the RPS volume is of about 8.5 µm. The RPS volume of about 8.5 µm means in the range 7 to 10 µm, and preferably in the range 8.0 to 9.0 µm. The monomodal distribution means that the distributions both in surface and volume are of the bell-shape with no shoulder nor side distributions.

In a specific embodiment the particle size can be additionally characterized by a RPS surface of about 6.5 µm. The RPS surface of about 6.5 µm means in the range 5 to 8 µm, advantageously in the range 5.2 to 7.8 µm and preferably in the range 5.5 to 7.5 µm.

The broadness of the rubber particle size distribution can be also roughly estimated by the RPS volume-to-RPS surface ratio, which should be preferably below 2.0, more preferably below 1.5 and most preferably equal or below 1.4.

As regards the plasticizers, represented globally by all the molecules soluble in methanol, the weight ratio c/(a+b+c) ranges advantageously from 0 to 5% and preferably from 1 to 4.5%. The plasticizer is any component that can increase the flexibility of the finished product, and reduce the melt viscosity of the bulk polymer to facilitate molding or extrusion. The plasticizer is e.g. a mineral oil or a non-mineral oil. "Mineral oil" means oil derived principally from petroleum, typically from the distillation of petroleum to produce gasoline. Typically, mineral oil is a mixture that contains a large number, e.g., hundreds, of different kinds of hydrocarbons, mainly linear and branched alkanes (n- and iso-paraffins) and cyclic paraffins, and it is liquid at ambient conditions. "Non-mineral oil" means one or more of vegetable, essential, silicone and animal oil.

"Vegetable oil" means oil derived principally from plants, particularly the seeds and nuts of plants, and comprised largely of glycerides of saturated and unsaturated fatty acids, e.g., oleic, palmitic, stearic and linolenic.

"Animal oil" means oil derived principally from animals, and those liquid under ambient conditions include fish oils, fish-liver oils, sperm oil and the like. Animal oils typically have high saturated fatty acid content.

"Essential oil" means oil derived principally from flowers, stems and leaves. These oils are complex, volatile liquids, typically contain terpenes, and contain relatively little, if any, glycerides of fatty acids.

Advantageously the plasticizer is selected among the mineral or vegetable oil compatible with the rubber. A major part of said plasticizer migrates in the rubber and enhance the RPVF. Plasticizers with a special structure affinity with the rubber phase and of low volatility are particularly recommended. By way of example, when the rubber is a polybutadiene, the plasticizer can be a butene oligomer of the type depicted in U.S. Pat. No. 6,613,831 and also known as a polybutene oil, a crude rapeseed oil, or a refined sunflower oil, preferably mixed with a 70 to 100 cSt white mineral oil. Advantageously the plasticizer is introduced prior or during the polymerization.

As regards the polymerization to make the above composition, it is carried out in a conventional manner by bulk polymerization, solution polymerization, or polymerization in aqueous dispersion, the rubber first being dissolved in the polymerizable monomer and this solution then being subjected to polymerization. Advantageously the process of the invention is carried out as a diluted bulk polymerization process. When using diluted bulk polymerization, the starting solution may be mixed with up to about ten percent (10%) by weight, based on the monovinylaromatic monomer employed, of an inert solvent so as to lower the polymerization bulk viscosity, to moderate polymerization heat and to improve thermal exchanges and heat homogeneity within the bulk. Suitable diluents include aromatic solvents such as ethylbenzene, toluene, xylenes, cyclohexane, and aliphatic hydrocarbon solvents, such as dodecane, isoparaffinic cuts and white spirits exhibiting average boiling points close to the EB and styrene b.p., and mixtures thereof. Any solvent useful to improve heat homogeneity within the bulk during polymerization, that can be removed after polymerization of the monovinylaromatic monomer, and that does not interfere with the polymerization of the monovinylaromatic monomer and the optional comonomer, can be used with the process of the present invention.

The rubber is "dissolved" in the monovinylaromatic monomer (actually the rubber is infinitely swollen with the monomer). Monovinylaromatic polymer is initially formed from the monovinylaromatic monomer within the homogeneous rubber solution in monovinylaromatic monomer. At the beginning of the polymerization the reacting solution is at a point prior to the rubber/monovinylaromatic monomer inversion point, i.e. the point at which the solution being reacted goes from monovinylaromatic polymer particles in a rubber/monovinylaromatic monomer matrix to rubber particles in a monovinylaromatic polymer matrix. In other words when the degree of polymerization is about equal to the weight % of rubber in the system it inverts e.g. the monovinylaromatic monomer/monovinylaromatic polymer phase becomes continuous and the rubber phase becomes discontinuous.

In the present invention a free radical initiator and a chain transfer agent are contacted with the polymerizable mixture prior to the inversion point such that when the phase inversion subsequently occurs, the molecular weight of the monovinylaromatic polymer before and during the phase inversion is considerably lowered as compared with what it would be in the absence of chain transfer agent.

The purpose of said molecular weight lowering is to have simultaneously a high viscous rubber phase and a fluid monovinylaromatic polymer phase at inversion point. These conditions are deemed to produce large rubber particles. Besides, they result in a much sharper increase of the rubber-to-PS phase viscosity ratio around phase inversion, making the thus formed rubber particles much less sensitive to the shear rate generated by the agitation conditions within the inversion reactor and the subsequent reactors. In other words, the large particles thus formed in the inversion reactor are less prone to be dismantled and sheared, guaranteeing a more uniform rubber particle size distribution.

Among suitable chain transfer agents, one can cite mercaptans or alpha-methyl styrene dimer. Agents of high chain transfer activity, i.e. characterized by a transfer coefficient $C_{tr}=k_{tr}/k_p$ well above 1, should be preferred, as they react mostly within the reactor they are injected in, without lowering too significantly the average molecular weight of PS in the final product As examples of mercaptans, the most preferred one is n-dodecyl mercaptan. Chain transfer agent is generally employed in an amount of from about 0.001 to about 0.5 weight percent based on the total weight of the polymerization mixture to which it is added. If the inversion reactor is preceded by a reactor maintained intentionally below phase inversion, commonly known as a pre-inversion reactor, the active transfer agent is preferably introduced in the pre-inversion reactor for guaranteeing the production of a well-uniform distribution of rubber particles in the subsequent inversion reactor.

Among the free radical initiators one can cite the peroxides. The peroxides can be classified as grafting initiators and as non-grafting initiators. Of course the grafting initiator doesn't make only grafting polymerization and non-grafting initiator doesn't make only non-grafting polymerization but the grafting initiator has an enhanced power to lead to grafting polymerization than the non-grafting initiator.

The grafting initiator is advantageously selected from the group consisting of 1,1-di-(t-butylperoxy)cyclohexane; 1,1-di-(t-amylperoxy)cyclohexane); 1,1-di-(t-butylperoxy)-3,3,5-trimethyl-cyclohexane; OO-t-amyl-0-(2-ethylbexyl monoperoxy-carbonate); OO-t-butyl O-isopropyl monoperoxy-carbonate; OO-t-butyl-0-(2-ethylhexyl)monoperoxy-carbonate; butyl 4,4-di(t-butylperoxy)valerate; Ethyl 3,3-Di-(t-butylperoxy)butyrate; and mixtures thereof. It is typically a peroxydic molecule releasing by thermal decomposition ter-butoxyl radicals that are prone to undergo H-abstracting reactions. The non-grafting initiator is advantageously selected from the group consisting of 2,2'-azobis (isobutyronitrile), 2,2'-azobis(2-methylbutyronitrile), lauroyl peroxide, decanoyl peroxide, and mixtures thereof. From about 50 to about 2000, preferably from about 100 to about 1500, weight parts of the initiator are employed per million weight parts of the polymerizable mixture.

Monovinylaromatic monomer is polymerized around and within the rubber particles, which leads to monovinylaromatic polymer inclusions in the rubber particles. A portion of the monovinylaromatic monomer is polymerized by grafting on the rubber, another portion is homopolymerized, said portion is referred to as a "non-grafting" polymerization. A part of the monovinylaromatic monomer may be replaced by unsaturated copolymerizable monomers as explained above. The same mechanism of "grafting" and "non-grafting" occurs with the comonomer, which means one portion of the monovinylaromatic monomer and of the comonomer are polymerized by grafting on the rubber and another portion of the monovinylaromatic monomer and of the comonomer are copolymerized.

The high impact monovinylaromatic polymers of the present invention can be prepared using additives. Exemplary additives include fillers such as talc, organoclays (clays wetted by an organic compatibilizer), anti oxidants (e.g., alkylated phenols such as di-tert-butyl-p-cresol or phosphates such as tri-nonyl phenyl phosphate), UV stabilizers, lubricants, mold release agents e.g., zinc stearate; PE waxes, pigments and the like. Any additive known to be useful in preparing high impact monovinylaromatic polymers to those of ordinary skill in the art of preparing such polymers can be used with the present invention. These additives, if any, are added to the reaction mixture where appropriate including before, during or after polymerization.

Although the resulting polymeric materials are particularly suitable as liners in a refrigerator or a freezer, they can be of interest in various uses including (non exhaustive list) TV front and back covers, households, electronic and electric appliances, dairy cups, food packagings, insulation foams, etc. . . . . All these apparatus can be made by the usual technology of the thermoplastics. Refrigerator liners are commonly manufactured industrially using extruded sheets of HIPS. The sheets are thermoformed into the desired shape and size by first heating them to bring the polymer above its glass transition temperature. The softened polymer is then pressed into a predetermined shape of a door or inner liner.

The present invention is also a process for preparing a high impact monovinylaromatic polymer comprising:
a) forming a polymerizable mixture comprising at least one monovinylaromatic monomer and optionally one or more comonomers,
b) dissolving at least a viscous rubber of essentially linear structure in said polymerizable mixture to form a rubber containing polymerizable solution,
c) contacting a free radical initiator and a chain transfer agent with the polymerizable mixture at conditions whereby phase inversion subsequently occurs, wherein the chain transfer agent is capable to produce an increase of the rubber to PS phase viscosity ratio within the inversion reactor,
d) continuing the polymerization of the solution obtained at step c), optionally in the presence of a free radical initiator, until a monovinylaromatic polymer matrix having rubber particles dispersed therein is obtained.

Optionally there is an additional step for degassing the product of step d) to separate the optional unpolymerized monomers and comonomers, optional diluents and recovering the high impact monovinylaromatic polymer.

Advantageously the chain transfer agent makes the rubber particles less sensitive to the shear rate within the inversion reactor. This results in a homogeneous distribution of large rubber particles.

The advantageous rubber of essentially linear structure within the frame of the present invention is characterized by SV-to-Mooney ratio of at least 2.8, and more preferably above 3.3.

Advantageously the $\overline{Mw}$ of the rubber ranges from 100,000 to 500,000 and preferably from 280,000 to 360,000 g/mol. Advantageously the polydispersity index of the rubber ranges from 2.1 to 2.5 and preferably from 2.1 to 2.3. Rubber molecular-weights can be measured by the conventional size-exclusion chromatography techniques. They are here expressed in PS equivalents, i.e. using iso-molecular PS samples as calibration standards.

The rubbers particularly suitable for this invention have a solution viscosity (SV), measured at 5.43% weight in toluene or styrene, of 50 to 1000 centipoises, preferably from 100 to 500 centipoises and more preferably from 120 to 250 centipoises. The rubbers particularly suitable for this invention also have a Mooney viscosity (ML4+1, 100° C.) of 5 to 120, preferably from 10 to 100 and more preferably from 30 to 60.

The rubber is advantageously employed in amounts such that the rubber-reinforced polymer product contains from about 2 to about 20 percent, preferably from about 3 to about 17 percent, more preferably about 3 to about 15 weight percent rubber, based on the total weight of the rubber modified monovinylaromatic polymer.

All the operating conditions relating to the process described above and concerning the process to make the liners for refrigerators and freezers are available in this process.

EXAMPLES

The examples which follow illustrate the invention. They should not be considered as limitations of the present invention. Parts and percentages are by weight, unless stated otherwise. The products are tested bu the following methods:
1. Molecular-weights are measured by size exclusion chromatography, using iso-molecular PS standards from Polymer Laboratories for the calibration.
2. Rubber particle sizes are measured with a laser granulometer.
3. The swell index, when mentioned, is calculated from the wet weight and dry weight obtained by ultra-centrifugating a solution of HiPS in toluene, according to the method described above.
4. The rubber phase volume fraction is calculated from Hashin's model and DMA results, using the Equation (1) given above.
5. Tensile properties are measured according to ISO 527-2.
6. Flexural properties are measured according to ISO 178.
7. The notched Izod values are obtained according to ISO 180.
8. Vicat 50N is measured according to ISO 306.
9. The melt-flow indices are measured following ISO 1133 (5 kg loading, 200° C.).
10. Resistance to stress-cracking agents: This test was derived from ISO 4599.

Five (5) injected dumbbell shipped halters (10*4*149.3 mm, ISO 527-2 A1) are exposed to fatty esters (e.g. olive oil) and submitted to a steady deformation for 1 day, 3 days, 4 days and 7 days, respectively. The deformation consists in bending the halters by setting a distance between clamps of 143 mm, which corresponds to a c.a. 20 MPa surface stress (see FIG. 1). After being removed from their support, the bended halters are let relax for 2 hrs under a 5 kg load prior to being submitted to tensile test measurements at a 50 mm/min rate. An extensiometer is used to record the displacement and the elongation at break with a good accuracy. Five (5) non-deformed and non-oil-exposed halters are used as references and submitted solely to tensile test measurements. The stress-cracking resistance is expressed in % as the averaged elong. @ brk of the oil-exposed & deformed specimens divided by the averaged elong. @ brk of the reference specimens. See FIG. 1;

A variant of this test consists in following up the drop of the elongation properties—the non-exposed and non-deformed samples being still taken as references—after a given time.

Example 1

A 5 liter continuously stirred tank reactor (CSTR) used as an inversion reactor is continuously fed with a 1.5 liter/hr flow of a rubber solution consisting of:
  (i) 7.7% of a 170 cps LiBR, commercialized by Lanxess under the tradename of Buna CB 528 T (aver. Mw=290,000 g/mol; SV-to-Mooney=3.1);
  (ii) 2.5% wt of 70 cSt white mineral oil;
  (iii) 6% wt Ethylbenzene;

This feed composition is polymerized within this inversion reactor at a temperature of 135° C. in the presence of 60 ppm of commercial ter-butylperoxy-isopropylcarbonate (Akzo Trigonox BPIC-C75, injected as it is) and of 60 ppm of commercial NDM (n-dodecyl mercaptan) from Arkema. The average residence time is of c.a. 90 min. The agitation speed in the reactor was adjusted so as to maintain a max shear rate at the tip of the blade of 48 s$^{-1}$. The bulk collected at the outlet of the inversion reactor and characterized by a solid content of c.a. 35% was further polymerized in a 20 liter batch reactor with a temperature profile of 140° C. (30 min) and 150° C. up to 60% solids. The resulting product was finally degassed in a single flash devolatilizer at 230° C. under 25 mbars prior to being pelletized. The resulting characteristics and properties of the final products are listed in Table 1.

Example 2

The same procedure is applied than in example 1, except for the rubber which is replaced by a 170 cps NdBR, commercialized by Lanxess under the tradename of Buna CB 728 T aver. Mw=455,000 g/mol; SV-to-Mooney=3.9). The use of this substantially more linear rubber of high-cis microstructure results in better cold Izod and stress-cracking resistance properties (see Table 1), fatty cream being here taken as the aggressive agent.

TABLE 1

| Product characteristics & properties | Example 1 | Example 2 |
|---|---|---|
| RPS, D50 vol (microns) | 7.6 | 8.8 |
| Rubber content (%) | 10.5 | 10.3 |
| RPVF (%) | 39.7 | 40.5 |
| Mw (g/mol) | 205,000 | 207,500 |
| MFI (g/10 min) | 2.8 | 2.6 |
| Flex. Modulus (MPa) | 1791 | 1858 |
| Notched Izod (kJ/m$^2$) at room temp. | 12.1 | 14.4 |
| Elong. @ Brk (%) | 55 | 52 |
| Izod loss @ −30° C. (%) | 37 | 23 |
| ESCR with fatty cream (30% fat) for 6 hrs - Elong. @ Brk. Loss (%) | 28 | 6 |

Examples 3-5

A rubber solution feed consisting of 8.5% of commercial 170 cps LiBR Intene 50 AF from Polimeri Europa and 3% of 70 cSt white mineral oil continuously feeds a series of polymerization reactors. The rubber solution is mixed with a recycle flow made of c.a. 58% styrene monomer and 42% diluent (éthylbenzène mainly). The global flowrate within the reactor train is of 40 kg/hr.

The feed solution is preheated at 90° C. in a tubular preheater. Luperox TBIC-M75 (commercial organic peroxide) and NDM, both from Arkema, are co-injected in a first CSTR-type reactor, R-201L, the temperature of which is set at 110° C. and which has an average residence time of 45 min. The solid content of this reactor is kept within the 12-14% solids range, i.e. well below phase inversion. The bulk solution therein is maintained under a high shear rate to limit the risks of formation of rubbery gels. Phase inversion proceeds under various conditions in the subsequent CSTR-type reactor R-202L, characterized by an average residence time of 110 min. and smooth agitation conditions (the agitation speed is set so as to maintain a max shear rate at the tip of the blade of 11 s$^{-1}$). The polymerization is then finished in a series of plug-flow type reactors, before the product is degassed in a series of two flash-devolatilizers and pelletized.

In Example 3, the TBIC dosage and the reactor & DV settings are adjusted so as to produce a standard HiPS suitable for conventional extrusion-thermoforming applications. No NDM is injected in the reactors.

In Example 4, the TBIC & NDM dosages as well as the reactor settings are adjusted so as to produce a HiPS grade of improved stress-cracking resistance, as described in the embodiments of the present invention.

The ESCR grade is further improved in Example 5 with refined devolatilization conditions.

The production conditions of the products of Examples 3-5 are described in Table 2 bellow, whereas the related product characteristics & properties are listed in Table 3.

Figure 2:
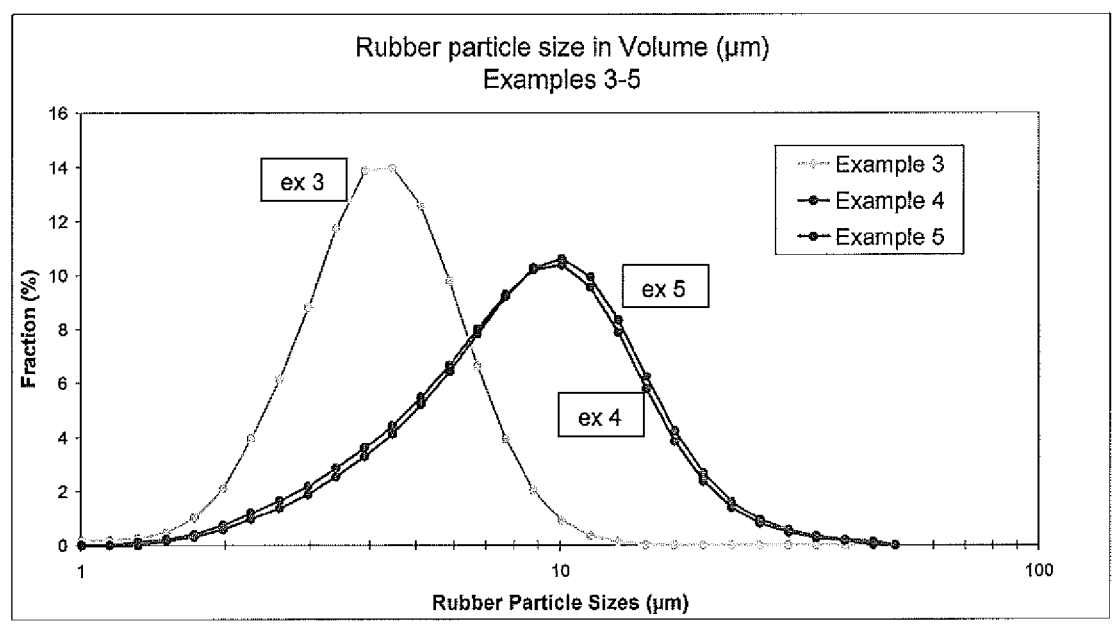
FIG. 2 depicts RPS distributions in volume of products.
Figure 3:
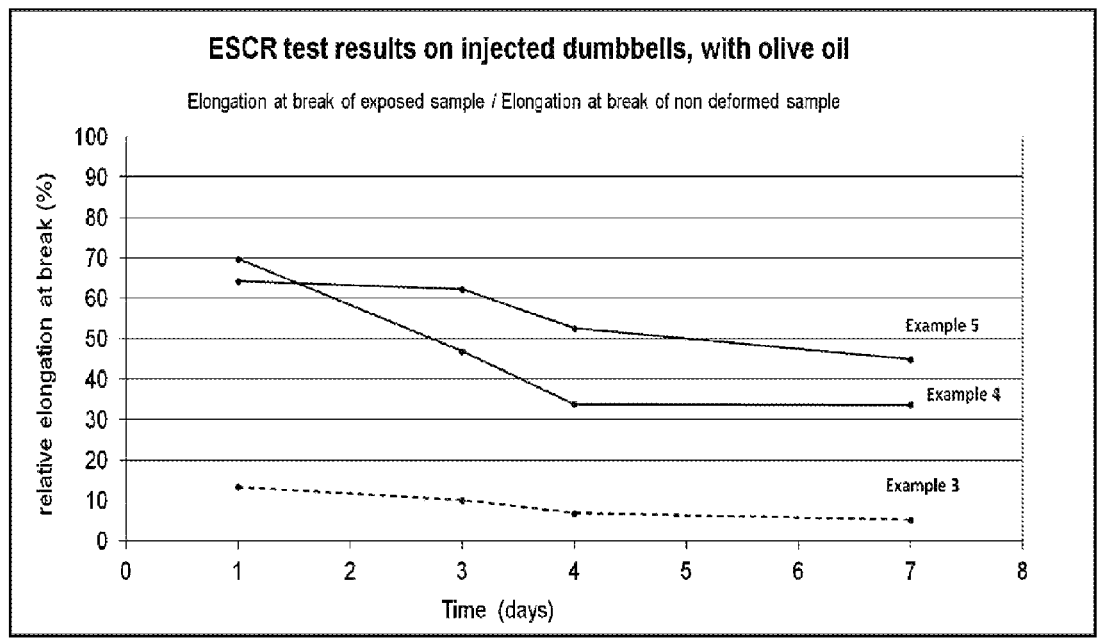
FIG. 3 depicts a representation of ESCR resistance with time, with olive oil as the stress-cracking agent.

FIG. 2 below shows the RPS distributions in volume of the products, whereas FIG. 3 gives a representation of their ESCR resistance with time, olive oil being taken as the stress-cracking agent. In table 3 RPS dispersion V/S means RPS volume-to-RPS surface ratio.

TABLE 2

| Operating Conditions | Example 3 | Example 4 | Example 5 |
|---|---|---|---|
| Temperature R-201 L (° C.) | 110 | 110 | 110 |
| TBIC-M75 peroxide injected in R-201 L (ppm) | 150 | 150 | 150 |
| Solid content in R-201 L (%) | 12.1 | 13.7 | 13.4 |
| Temperature R-202 L (° C.) | 124 | 129 | 129 |
| NDM injected in R-202L (ppm) | 0 | 150 | 150 |
| Solid content in R-202 L (%) | 28.7 | 35.0 | 34.9 |
| Temperature profile in the plug-flow finishing reactors (° C.) | 141/158 | 141/156 | 141/156 |
| Solid content at the outlet of the last reactor (%) | 70.1 | 74.3 | 74.5 |
| DV1 Preheater OIL Temperature (° C.) | 255 | 255 | 246 |
| DV1 Polymer Temp/° C. | 241 | 242 | 229 |
| DV2 Polymer Temp/(° C.) | 240 | 240 | 230 |
| Vacuum @ 1st Devol (mmHg) | 19 | 22 | 28 |
| Vacuum @ 2nd Devol (mmHg) | 6 | 6 | 6 |

TABLE 3

| Iot nr | | Example 3 | Example 4 | Example 5 |
|---|---|---|---|---|
| Mw | (kDa) | 167 | 156 | 155 |
| % Pbu | (%) | 8.5 | 8.5 | 8.5 |
| particles S/V | (μm) | 3.3/3.9 | 5.6/8.0 | 5.9/8.3 |
| RPS dispersion, V/S | | 1.2 | 1.4 | 1.4 |
| RPVF | (%) | 35.7 | 39.4 | 42.2 |
| Gel content | (%) | 29.7 | 31.4 | 29.5 |
| Swell Index | | 13.5 | 13.9 | 16.4 |
| MFI | (g/10') | 3.9 | 4.5 | 4.8 |
| Vicat 50N | (° C.) | 88.9 | 87.8 | 86.3 |
| Flexural Modulus (Prat) | (MPa) | 1610 | 1520 | 1550 |
| Notched Izod | (KJ/m2) | 8.3 | 8.5 | 9.5 |

The invention claimed is:

1. A refrigerator interior liner comprising:
   a rubber modified monovinylaromatic polymer composition, wherein the rubber modified monovinylaromatic polymer composition comprises:
   a) a monovinylaromatic polymer matrix having an average molecular weight in weight $\overline{Mw}$ above 150,000 g/mol; and
   b) rubber particles dispersed in the monovinylaromatic polymer matrix, wherein the rubber particles have:
   a volume median particle size (RPS volume) ranging from 7 μm to 10 μm;
   a monomodal distribution;
   a ratio of RPS volume to surface median particle size (RPS surface) that is below 2;
   a crosslinking of the rubber expressed as a swell index (SI) above 13.8; and
   a rubber phase volume fraction (RPVF) of at least 39%.

2. The refrigerator interior liner of claim 1, wherein the rubber particles have an RPS surface of from 5 to 8 μm.

3. The refrigerator interior liner of claim 1, wherein the rubber has a solution viscosity-to-Mooney viscosity ratio of at least 2.8.

4. The refrigerator interior liner of claim 1, wherein the rubber has an average molecular weight in weight Mw ranging from 100,000 g/mol to 500,000 g/mol.

5. The refrigerator interior liner of claim 1, wherein the rubber has a polydispersity index ranging from 2.1 to 2.5.

6. The refrigerator interior liner of claim 1, wherein the rubber has a solution viscosity (SV), measured at 5.43% weight in toluene, of 50 to 1000 centipoises.

7. The refrigerator interior liner of claim 1, wherein the rubber has a Mooney viscosity (ML4+1, 100° C.) of 5 to 120.

8. The refrigerator interior liner of claim 1, wherein the monovinylaromatic polymer has a polydispersity ranging from 2.2 to 3.

9. The refrigerator interior liner of claim 1, wherein the rubber modified monovinylaromatic polymer composition comprises from 2 to 20 weight percent of the rubber particles.

10. The refrigerator interior liner of claim 1, wherein the rubber modified monovinylaromatic polymer composition has a melt flow index ranging from 2 to 10 g/10 min, measured following ISO 1133 at 200° C. and a load of 5 kg.

11. A rubber modified monovinylaromatic polymer composition comprising:
   a) a monovinylaromatic polymer matrix having an average molecular weight in weight $\overline{Mw}$ above 150,000 g/mol; and
   b) rubber particles dispersed in the monovinylaromatic polymer matrix, wherein the rubber particles have:
      a volume median particle size (RPS volume) ranging from 7 μm to 10 μm;
      a monomodal distribution;
      a ratio of RPS volume to surface median particle size (RPS surface) that is below 2;
      a crosslinking of the rubber expressed as a swell index (SI) above 13.8; and
      a rubber phase volume fraction (RPVF) of at least 39%.

12. The rubber modified monovinylaromatic polymer composition of claim 11, wherein the rubber particles have an RPS surface of from 5 to 8 μm.

13. The rubber modified monovinylaromatic polymer composition of claim 11, wherein the rubber has a solution viscosity-to-Mooney viscosity ratio of at least 2.8.

14. The rubber modified monovinylaromatic polymer composition of claim 11, wherein the rubber has an average molecular weight in weight Mw ranging from 100,000 g/mol to 500,000 g/mol.

15. The rubber modified monovinylaromatic polymer composition of claim 11, wherein the rubber has a polydispersity index ranging from 2.1 to 2.5.

16. The rubber modified monovinylaromatic polymer composition of claim 11, wherein the rubber has a solution viscosity (SV), measured at 5.43% weight in toluene, of 50 to 1000 centipoises.

17. The rubber modified monovinylaromatic polymer composition of claim 11, wherein the rubber has a Mooney viscosity (ML4+1, 100° C.) of 5 to 120.

18. The rubber modified monovinylaromatic polymer composition of claim 11, wherein the monovinylaromatic polymer has a polydispersity ranging from 2.2 to 3.

19. The rubber modified monovinylaromatic polymer composition of claim 11, wherein the rubber modified monovinylaromatic polymer composition comprises from 2 to 20 weight percent of the rubber particles.

20. The rubber modified monovinylaromatic polymer composition of claim 11, wherein the rubber modified monovinylaromatic polymer composition has a melt flow index ranging from 2 to 10 g/10 min, measured following ISO 1133 at 200° C. and a load of 5 kg.

* * * * *